US008690628B2

(12) United States Patent
Lee et al.

(10) Patent No.: US 8,690,628 B2
(45) Date of Patent: Apr. 8, 2014

(54) METHOD FOR FABRICATION OF THIN FILM PHOSPHOR, THIN FILM PHOSPHOR, AND PHOSPHOR PRODUCT USING THE SAME

(75) Inventors: Eun-Wook Lee, Gyeonggi-do (KR); Jong-Soo Kim, Busan (KR); Je-Hong Park, Busan (KR)

(73) Assignee: Lstone Co., Ltd., Bucheon-si (KR)

( * ) Notice: Subject to any disclaimer, the term of this patent is extended or adjusted under 35 U.S.C. 154(b) by 309 days.

(21) Appl. No.: 12/676,350

(22) PCT Filed: Jul. 3, 2009

(86) PCT No.: PCT/KR2009/003654
§ 371 (c)(1),
(2), (4) Date: May 24, 2010

(87) PCT Pub. No.: WO2010/002224
PCT Pub. Date: Jan. 7, 2010

(65) Prior Publication Data
US 2010/0284166 A1 Nov. 11, 2010

(30) Foreign Application Priority Data

Jul. 3, 2008 (KR) .......................... 10-2008-0064395
Jul. 3, 2009 (KR) .......................... 10-2009-0060593

(51) Int. Cl.
H01J 9/00 (2006.01)

(52) U.S. Cl.
USPC .............................. 445/24; 313/486; 313/502

(58) Field of Classification Search
USPC ............................... 445/23–25; 313/486, 502
See application file for complete search history.

(56) References Cited

U.S. PATENT DOCUMENTS

| 2002/0081373 A1* | 6/2002 | Hsu et al. ......................... 427/64 |
| 2004/0061439 A1* | 4/2004 | Cok ............................... 313/512 |
| 2007/0046176 A1* | 3/2007 | Bukesov et al. ............. 313/496 |
| 2007/0051924 A1* | 3/2007 | Oike et al. ............. 252/301.4 F |

FOREIGN PATENT DOCUMENTS

| JP | 2003-183646 | 7/2003 |
| JP | 2003-301171 | 10/2003 |
| JP | 2003-318201 | 11/2003 |
| WO | 03/080765 | 10/2003 |

* cited by examiner

*Primary Examiner* — Andrew Coughlin
(74) *Attorney, Agent, or Firm* — Lexyoume IP Meister, PLLC.

(57) ABSTRACT

Disclosed are a method for fabrication of a thin film phosphor, a thin film phosphor and a product using the same. The thin film phosphor is fabricated by adsorbing a raw material to a surface of a substrate simultaneously with diffusing the same or, otherwise, depositing the raw material on the substrate and heating the same, so as to diffuse the raw material from the surface of the substrate into the substrate wherein the substrate contains at least one selected from constitutional elements of the phosphor. The fabricated thin film phosphor has a constitutional composition continuously varied to gradually come close to a constitutional composition of the substrate when the constitutional elements of the phosphor are diffused from a surface to an inner side of the substrate. In particular, if the substrate material, the raw material and the phosphor layer material have the same or similar structure, and when the phosphor layer material has an anisotropic texture structure, light luminance is maximized while a decay time is minimized. According to this disclosure, different thin film phosphors with improved luminance comparable to that of a powder phosphor may be fabricated. Compared to such powder phosphor, the thin film phosphor fabricated as described above is thermally and chemically stable and does not exhibit an interference pattern or light reflection between the thin film phosphor and the substrate so as to have excellent light transmission, thereby being applicable to large-scale display devices.

17 Claims, 14 Drawing Sheets

METHOD FOR FABRICATION OF THIN FILM PHOSPHOR, THIN FILM PHOSPHOR, AND PHOSPHOR PRODUCT USING THE SAME

CROSS-REFERENCE TO RELATED APPLICATION

This application is a National Stage of the International Application No. PCT/KR2009/003654 filed on Jul. 3, 2009, which claims the benefit under 35 U.S.C. §119(a) of Korean Patent Application Nos. 10-2008-0064395 and 10-2009-0060593, filed on Jul. 3, 2009 and Jul. 3, 2009, the disclosure of which are incorporated herein in its entirety by reference.

BACKGROUND OF THE INVENTION

1. Field of the Invention

The present invention relates to a thin film phosphor and, more particularly, a thin film phosphor fabricated by forming a raw material of the phosphor on a surface of a workpiece material such as a substrate, a phosphor product manufactured using the same, and a method for fabrication thereof.

2. Description of the Related Art

Flat panel displays (FPDs) currently developed as an information transmission device are generally classified into light receiving types such as liquid crystal display (LCD) and light emitting types such as plasma display panel (PDP), field emission display (FED), electroluminescence display (ELD), vacuum fluorescent display (VFD), etc. Although the light emitting type FPD is distinguishable into different type devices in terms of structure and light emission source, all of these devices commonly make use of a phosphor. Such phosphor may be divided into a powder phosphor and a thin film phosphor.

A result of comparing characteristics between the thin film phosphor and the powder phosphor is shown in the following table. As shown in the table, the thin film phosphor exhibits superior characteristics over the powder phosphor except for light emission efficiency and, especially, has remarkably excellent resolution.

TABLE 1

Comparison of characteristics between thin film phosphor and powder phosphor

| Feature | Thin film phosphor | Powder phosphor |
| --- | --- | --- |
| Light emission efficiency | Inferior | Superior |
| Crystal structure | Single crystal | polycrystalline |
| Decay time (1/10 original luminance) | 10 ms | 12 ms |
| Resolution | Less than 1 μm | 5 to 10 μm |
| Screen shade | Superior | Inferior |
| Lifespan | Superior | Inferior |
| Thermal, mechanical stability | Superior | Inferior |
| Production cost | High | Low |

Among factors effecting light emission efficiency of a thin film phosphor, there are a quantitative ratio of elements in the thin film, optimization of additives, crystallinity, surface conditions of the thin film, growth orientation, etc. A principal cause of lowering effects of the thin film phosphor is light loss due to total internal reflection of 80 to 90% light. For a powder phosphor, since light is emitted outside after internal reflection several times, the total internal reflection causes only a small reduction in light emission efficiency. However, for a thin film phosphor with a flat thin film, due to total internal reflection, only light incident on a surface of the film, wherein the light has an incident angle less than a critical angle, is emitted outside. Briefly, only several % of light from the phosphor is emitted outside.

Although the powder phosphor has excellent light emission efficiency, a display resolution is restricted due to a size of particle, poor reliability and processing difficulties are entailed in patterning, etc. Therefore, a thin film phosphor is generally used in related arts.

A thin film phosphor is generally fabricated by conventional methods such as sputtering, pulsed laser deposition (PLD), e-beam, sol-gel, chemical vapor deposition (CVD), and so forth. However, as disclosed above, such a thin film phosphor fabricated by the foregoing methods entails problems of considerably decreased such as light emission efficiency, compared to a powder phosphor. In order to solve the problems, a variety of processes including, for example, rough processing of a surface of the thin film in order to decrease total internal reflection, or other treatments to improve crystallinity and/or orientation have been proposed.

Recently, in order to improve light emission efficiency of the thin film phosphor, heat treatment at a high temperature is well known. According to such treatment, when the thin film is heated at a high temperature of more than 1,000° C. after forming the same, the phosphor has crystallinity substantially equal to powder and a rough surface thereof, thus a high light is emission efficiency can be expected. However, since a FPD uses a glass substrate which cannot be heated at a temperature of more than 600 to 700° C., the thin film phosphor encounters a problem of not being applied to a practical process for manufacturing of FPDs.

Conventional methods for formation of thin film phosphors do not meet a recent tendency to increase in scale of a substrate, a thin film phosphor fabricated by the conventional method has poor luminance, and transparency of the phosphor is not suitably obtained due to interference patterns at a boundary between the phosphor and a substrate and/or light reflection. Accordingly, use of the thin film phosphor is considerably restricted.

SUMMARY OF THE INVENTION

Accordingly, in order to improve poor light emission properties of a thin film phosphor compared to a powder phosphor, an object of present invention is to provide a thin film phosphor with improved crystallinity and orientation while minimizing total internal reflection, having no boundary with a substrate, and a method for fabrication of the thin film phosphor.

Another object of the present invention is to provide phosphor products manufactured using the foregoing thin film phosphor, such as FPDs, light emitting devices, fluorescent plates, etc.

In order to accomplish purposes of the present invention described above, the present invention provides a method for fabrication of a thin film phosphor by forming a phosphor on a substrate, which includes; preparing at least one substrate having at least one selected from various constitutional elements for the phosphor, as well as a raw material consisting of all constitutional elements for the phosphor or, otherwise, other constitutional elements for the phosphor except for the element(s) contained in the substrate, in a chamber; and diffusing the raw material from a surface to an inner side of the substrate to form a phosphor layer.

More particularly, the preparation process is conducted by preparing a substrate having at least one selected from constitutional elements for the phosphor, as well as a raw material consisting of all constitutional elements for the phosphor or, otherwise, other constitutional elements for the phosphor except for the element(s) contained in the substrate, wherein the phosphor includes at least two elements including an activating agent.

In such preparation process, the substrate has substantially the same or similar crystalline structure as that of the phosphor layer. Here, the substrate includes amorphous quartz, while both the raw material and a phosphor layer material have a hexagonal structure after heat treatment. The substrate includes amorphous quartz and the phosphor layer material has a textural structure grown only in limited crystal growth orientation, after heat treatment.

More particularly, the substrate may comprise amorphous quartz and a surface of the phosphor layer may have unevenness in a shape of convex lens having a diameter of 1 to 10 μm.

According to an embodiment of the present invention, the substrate includes amorphous quartz, the raw material includes ZnO:Mn, and the phosphor layer material comprises $Zn_2SiO_4$:Mn.

According to another embodiment of the present invention, the substrate includes amorphous quartz, the raw material includes BaO:Eu, and the phosphor layer material comprises $BaSi_2O_5$:Eu.

According to another embodiment of the present invention, the substrate includes single crystal or polycrystalline $Al_2O_3$, and the raw material and the phosphor layer material have a hexagonal structure after heat treatment.

The phosphor formation process described above is conducted by adsorbing the raw material to a surface of the substrate and, at the same time, subjecting the phosphor constitutional elements of the substrate to thermal diffusion or plasma diffusion.

After the formation process, the inventive method further includes a step of forming a transparent layer on a surface of the phosphor layer.

The formation process includes heating an inner space of the chamber at a temperature less than a substrate deforming or melting temperature while maintaining the same under vacuum, wherein an internal pressure of the chamber ranges from $10^{-4}$ to $10^{+3}$ Torr at an initial stage of the formation process.

More particularly, the formation process includes heat treatment of the substrate at 700 to 2,000° C. after depositing or applying the raw material to a surface of the substrate.

The thin film phosphor of the present invention includes a phosphor layer containing phosphor constitutional element(s) diffused from a surface to an inner side of the substrate wherein the substrate comprises at least one selected from the phosphor constitutional elements, and wherein a constitutional composition of the phosphor layer is continuously varied to gradually come close to a constitutional composition of the substrate when the phosphor constitutional elements are diffused from a surface to an inner side of the substrate.

In this case, the phosphor layer has a textural structure with limited crystal orientations of 2 to 10 wherein each crystal orientation is defined according to Miller index in X-ray diffraction pattern.

The inventive thin film phosphor products may include at least one selected form a light emitting FPD, an electroluminescent device, an X-ray excitation fluorescent plate, an electron excitation fluorescent plate, an UV excitation fluorescent plate, a blue light excitation fluorescent plate, and the like.

According to the present invention, some of constitutional elements for a phosphor are used for a substrate while all or other constitutional elements except for those used for the substrate are used as a raw material, thereby enabling formation substantially all types of thin film phosphors. Consequently, such fabricated thin film phosphors may be employed in a wide range of applications without limitation to display products. Also, the thin film phosphor has light emission properties equal to those of a powder phosphor and excellent transmission rate, thus being effectively applied to a fluorescent sheet for OLED color conversion, a fluorescent plate for X-Ray device or electron microscope, etc., in addition to light emitting FPDs described above.

Moreover, the method for fabrication of a thin film phosphor according to the present invention may be used for a large-scale substrate and may considerably reduce manufacturing costs thereof.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF SYMBOLS FOR MAJOR PARTS IN DRAWINGS

| 1: substrate | 2: raw material |
|---|---|
| 3: chamber | 4: heating unit |
| 5: vacuum pump | 6: sample pot |
| 7: substrate support | |

DETAILED DESCRIPTION OF THE INVENTION

Hereinafter, preferred embodiments of the present invention will be described in more detail through the following examples, in conjunction with accompanying drawings. In these regards, a preformed base on which a thin film phosphor is formed may include a substrate and/or other various shaped materials such as wire, a drinking cup, etc. For brevity, the following description is given of a substrate.

Figure 1:
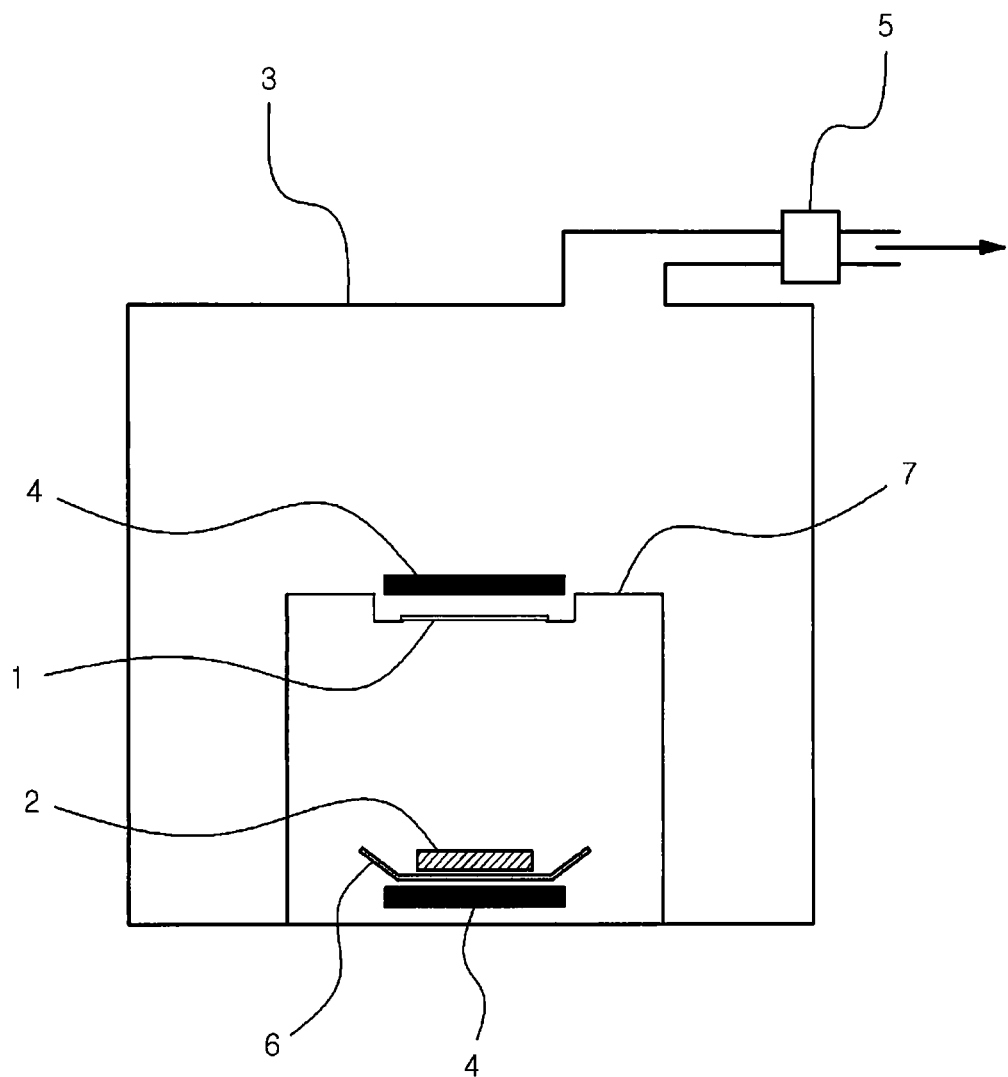
FIG. 1 is a schematic view showing a configuration of an apparatus for fabrication of a thin film phosphor according to the present invention.

FIG. 1 is a schematic view showing a configuration of an apparatus for fabrication of a thin film phosphor according to the present invention. As shown in FIG. 1, a substrate 1 and a raw material 2 are placed apart from each other in a chamber 3 equipped with a heating unit 4 such as a resistance coil and a vacuum pump 5. Here, the substrate 1 is positioned on a substrate support 7 and the raw material 2 is prepared in a powder state in a sample pot 6.

Referring to FIG. 1, one substrate 1 and one the raw material 2 are aligned in parallel in the chamber 3. However, the present invention is not particularly limited thereto. Also, at least one substrate 1 may be placed in the chamber 3. These are to be because the raw material 2 may be deposited on a rear face of the substrate 1 as well as a surface of the same facing the raw material 2, thus enabling alignment of at least one substrate 1 inside the chamber 3 if necessary.

A method for fabrication of a thin film phosphor using the foregoing apparatus according to the present invention includes: preparing at least one substrate having at least one selected from various constitutional elements for the phosphor, as well as a raw material consisting of all constitutional elements for the phosphor or, otherwise, other constitutional elements for the phosphor except for the element(s) contained in the substrate, and placing the prepared substrate and raw material in a chamber; and evaporating the raw material to adsorb the same to a surface of the substrate and, at the same time, diffusing the raw material into the phosphor constitutional elements to form a phosphor layer. The foregoing method may further include forming a transparent layer on the surface of the phosphor layer after formation of the phosphor layer.

The following description will be given to firstly explain separate processes of the inventive method for fabrication of the thin film phosphor according to the present invention, and then, to describe an EL, an emergency exit displaying device and a decorative crystal cup, as illustrative examples of a product manufactured using the foregoing thin film phosphor.

1. Preparation of Substrate and Raw Material

Firstly, a substrate and a raw material are placed in a chamber. The substrate comprises at least one selected from constitutional elements of a phosphor and the raw material may comprise all constitutional elements of the phosphor or, otherwise, other constitutional elements of the phosphor except to for the element(s) contained in the substrate.

According to an exemplary embodiment of the present invention, a raw material comprised all constitutional elements of a phosphor except element(s) contained in a substrate. The following Table 2 shows examples of constitutional elements of both a substrate and a raw material based on different thin film phosphors listed in the same table.

TABLE 2

Constitutional elements of substrate and raw material based on different thin film phosphors

| Phosphor | Substrate | Raw material |
|---|---|---|
| $Zn_2SiO_4: Mn^{2+}$ | $SiO_2$ | $ZnO + 0.08MnO$ |
| | $ZnO$ | $SiO_2 + 0.08MnO$ |
| $BaSi_2O_5: Eu^{2+}$ | $SiO_2$ | $BaO + 0.05Eu_2O_3$ |
| | $BaO$ | $SiO_2 + 0.05Eu_2O_3$ |
| | $BaSi_2O_5$ | $Eu_2O_3$ |
| $ZnAl_2O_4: Mn^{2+}$ | $Al_2O_3$ | $ZnO + 0.005MnO$ |
| | $ZnO$ | $Al_2O_3 + 0.005MnO$ |

As described in the above embodiment, it can be seen that appropriately selecting constitutional elements of both the raw material and the substrate may enable fabrication of all types of thin film phosphors.

Briefly, a thin film phosphor possibly formed according to the present invention may include, for example, silicate based phosphors, aluminate based phosphors, gallate based phosphors, fluorine containing phosphors, nitride phosphors, sulfide phosphors, phosphate phosphors, and so forth. Illustrative examples of such phosphors are listed below.

TABLE 3

Thin film phosphors possibly fabricated by the present invention

| Types of phosphors | Representative phosphors |
|---|---|
| Silicate based phosphors | $Zn_2SiO_4: Mn^{2+}$, $Zn_2SiO_4: Ti$, $(Zn, Be)_2SiO_4: Mn^{2+}$, $(Zn, Cd, Mg)SiO_4: Mn^{2+}$, $Mg_2SiO_4: Tb^{3+}$, $BaSi_2O_5: Eu^{2+}$, $Ba_2SiO_4: Eu^{2+}$, $Sr_2SiO_4: Eu^{2+}$, $Sr_2ZnSi_2O_7: Eu^{2+}, Dy^{3+}$, $Sr_2MgSi_2O_7: Eu^{2+}, Dy^{3+}$, $Sr_3MgSi_2O_8: Eu^{2+}, Dy^{3+}$, $(Sr, Ca)MgSi_2O_7: Eu^{2+}, Dy^{3+}$, $SrMg(SiO_4)_2: Eu^{2+}$, $SrAl_2SiO_6: Eu^{2+}$, $Sr_3Al_{10}SiO_{20}: Eu^{2+}$, $Sr_3Al_{10}SiO_{20}: Eu^{2+}, Ho^{3+}$, $(Ca, Mg)Al_2Si_2O_8: Eu^{2+}$, $CaAl_2Si_2O_8: Eu^{2+}Dy^{3+}$, $Ca_2Al_2SiO_7: Ce^{3+}$, $Ca_2Al_2SiO_7: Mn^{2+}, Ce^{3+}$, $CaSiO_4: Pb, Mn^{2+}$, $CaMgSi_2O_6: Eu^{2+}, Dy^{3+}$, $CaMgSi_2O_6: Eu^{2+}, Nd^{3+}$, $Ca_2MgSi_2O_7: Ce^{3+}$, $Ca_2MgSi_2O_7: Eu^{2+}, Dy^{3+}$, $CaMgSi_2O_6: Eu^{2+}$, $Ca_3MgSi_2O_8: Eu^{2+}, Dy^{3+}$, $Ba_3MgSi_2O_8: Eu^{2+}, Mn^{2+}$, $Ba_2MgSi_2O_7: Eu^{2+}, Dy^{3+}$, $BaMg_2Si_2O_7: Eu^{2+}, Mn^{2+}$, $Y_2SiO_5: Tb^{3+}$, $Y_2SiO_4: Ce^{3+}$, |

TABLE 3-continued

Thin film phosphors possibly fabricated by the present invention

| Types of phosphors | Representative phosphors |
|---|---|
| | $Y_2SiO_4$: $Ce^{3+}$, $Sm^{3+}$, $Y_2SiO_5$: $Eu^{3+}$, $Bi_4Si_3O1_{12}$, $Gd_2SiO_5$: $Ce^{3+}$, $Lu_2SiO_5$: $Ce^{3+}$, $LiYSiO_4$: $Ce^{3+}$, $CdSiO_3$: $Sm^{3+}$, $CdSiO_3$: $Pb^{2+}$, $CdSiO_3$: $Mn^{2+}$, $CdSiO_3$: $Mn^{2+}$, $Gd^{3+}$, $CdSiO_3$: $In^{3+}$, $MgSiO_3$: $Mn^{2+}$, $Eu^{2+}$, $Dy^{3+}$, $Na_4CaSi_7O_{17}$: $Cu^{2+}$, $Sn^{2+}$ |
| Aluminate based phosphors | $Y_3Al_5O_{12}$: $Ce^{3+}$, $Y_3(Al, Ga)_5O_{12}$: $Ce^{3+}$, $Y_3Al_5O_{12}$: $Tb^{3+}$, $Y_3Al_5O_{12}$: $Eu^{3+}$, $Ce^{3+}$, $MgAl_{11}O_{19}$: $Tb^{3+}$, $Mg(Ga, Al)_2O_4$: $Mn^{2+}$, $BaMgAl_{10}O_{17}$: $Eu^{2+}$, $BaMgAl_{10}O_{17}$: $Mn^{2+}$, $BaMgAl_{14}O_{23}$: $Eu^{2+}$, $BaAl_{12}O_{19}$: $Mn^{2+}$, $BaMg_2Al_{14}O_{24}$: $Eu^{2+}$, $BaMg_2Al_{14}O_{24}$: $Eu^{2+}$, $Mn^{2+}$, $BaAl_{12}O_{19}$: $Mn^{2+}$, $BaAl_2O_4$: $Eu^{2+}$, $Dy^{3+}$, $SrAl_{12}O_{19}$: $Mn^{2+}$, (Ba, Sr, Mg)$OAl_2O_3$: $Mn^{2+}$, $ZnAl_{12}O_{19}$: $Mn^{2+}$, $ZnAl_2O_4$: $Mn^{2+}$, $Ca_{12}Al_{14}O_{33}$: $Eu^{2+}$, $Nd^{3+}$, $CaAl_{12}O_{19}$: $Mn^{2+}$, $CaYAl_2O_7$: $Ce^{3+}$, $SrAl_2O_4$: $Eu^{2+}$, $SrAl_2O_4$: $Ce^{3+}$, $CaAl_2O_4$: $Ce^{3+}$, $BaAl_2O_4$: $Ce^{3+}$, (Sr, Ca)$Al_2O_4$: $Eu^{2+}$, $Nd^{3+}$, $SrAl_2O_4$: $Eu^{2+}$, $Dy^{3+}$, $SrAl_4O_7$: $Eu^{2+}$, $Dy^{3+}$, $Sr_4Al_{14}O_{25}$: $Eu^{2+}$, $Dy^{3+}$, $YAlO_3$: $Ce^{3+}$, $LuAlO_3$: $Ce^{3+}$, $Lu_3Al_5O_{12}$: $Ce^{3+}$, $GdAlO_3$, $Yb_3Al_5O_{12}$, $La_2Al_{22}O_{36}$: $Mn^{2+}$, Li, $CaAl_2O_4$: $Tb^{3+}$, $Ce^{3+}$, $CaAl_4O_7$: $Tb^{3+}$, $Ce^{3+}$, $MgAl_2O_4$: $V^{3+}$ |
| Fluorine containing phosphors | $MgF_2$: $Mn^{2+}$, (Zn, Mg)$F_2$: $Mn^{2+}$, (K, Mg)$F_2$: $Mn^{2+}$, $CaF_2$: $Eu^{2+}$, $CsF_2$: $Eu^{2+}$, $BaF_2$: $Eu^{2+}$, $LiBaF_3$: $Ce^{3+}$ |
| Gallate based phosphors | $MgGa_2O_4$: $Eu^{3+}$, $ZnGa_2O_4$: $Mn^{2+}$, $Ga_2O_3$: $Eu^{3+}$ |
| Nitride phosphors | AlN, YSiON: $Ce^{3+}$, $BaAl_{11}ON$: $Eu^{2+}$, $SrSi_5AlO_2N_7$: $Eu^{2+}$, $BaSi_2O_2N_2$: $Eu^{2+}$, (Sr, Ba)$YSi_4N_7$: $Eu^{2+}$, (Ca, Sr)$Si_2O_2N_2$: $Eu^{2+}$, $LaSi_3N_5$: $Eu^{2+}$, $LaEuSi_2N_3O_2$, $Ca_2Si_5N_8$: $Eu^{2+}$, (Sr, Ba)$_2Si_5N_8$: $Eu^{2+}$, $CaAlSiN_3$: $Eu^{2+}$ |
| Sulfide phosphors | ZnS: Cu, Cl, ZnS: Cu, Al, ZnS: Mn, (Zn, Cd)S: Ag, (Zn, Cd)S: Ag, Cl, (Zn, Cd)S: Cu, Al, (Zn, Cd)S: Ag, Au, Al $SrGa_2S_4$: $Eu^{2+}$, $Gd_2O_2S$: $Tb^{3+}$, $Y_2O_2S$: $Eu^{3+}$ |
| Phosphate phosphors | $LaPO_4$: $Tb^{3+}$, $LaPO_4$: $Ce^{3+}$, $Tb^{3+}$, $Sr_2P_2O_7$: $Sn^{2+}$, $Sr_2P_2O_7$: $Eu^{2+}$, $SrMgP_2O_7$: $Eu^{2+}$, $Sr_3(PO_4)_2$: $Eu^{2+}$, (Sr, Mg)$_2P_2O_7$: $Eu2^+$, (Sr, Mg)$_3(PO_4)_2$: $Cu^{2+}$, (Sr, Mg)$_3(PO_4)_2$: $Sn^{2+}$, $Ca_3(PO4)_2$: Ti+, $Zn_3(PO_4)_2$: $Mn^{2+}$ |
| Others | ZnO: Zn, $Y_2O_3$: $Eu^{3+}$, Y(V, P)$O_4$: $Eu^{2+}$, $YVO_4$: $Eu^{3+}$, $YVO_4$: $Dy^{3+}$, $MgGa_2O_4$: $Mn^{2+}$, $6MgOAs_2O_5$: $Mn^{2+}$ |

Meanwhile, other than the thin film phosphor comprising single phosphor component shown in Table 2, an alternative thin film phosphor including at least two phosphor components may be fabricated. That is, a thin film phosphor having a combination of at least two phosphors may be fabricated by preparing a substrate comprising at least one selected from common constitutional elements of both the phosphors and, in addition, a raw material comprising all constitutional elements of each phosphor, or, otherwise, other constitutional elements of the phosphor except for the element(s) contained in the substrate.

Meanwhile, in order to form a thin film phosphor on a part of the surface of the substrate, a mask may be provided on the substrate surface, thus enabling formation of a thin film phosphor having a desired pattern via the mask. Furthermore, the pattern may emit light through, for example, electroluminescence.

2. Combination of Substrate and Raw Material

Formation of a phosphor layer containing a raw material diffused into a surface of a substrate may involve thermal diffusion or plasma diffusion while adsorbing the raw material to the substrate surface (hereinafter, 'first combination process') or firstly depositing the raw material on the substrate surface then heating the deposited substrate as a post-treatment (hereinafter 'second combination process').

The raw material is laminated to a certain thickness according to combination conditions and, during lamination, inter-diffusion occurs between constitutional elements of the substrate and the raw material. As a result, a boundary between an original surface of the substrate before combination and the laminated surface thereof disappears. While the raw material is gradually diffused into the substrate, a constitutional composition thereof approaches a constitutional composition of the substrate. Hereinafter, the original surface of the substrate and other parts at which inter-diffusion occurs between constitutional elements of the substrate and the raw material are referred to as 'a phosphor layer.'

1) First Combination Process

After placing a substrate and a raw material in a chamber, the chamber is maintained at a pressure of $10^{-4}$ to $10^{+3}$ Torr. If the pressure is less than the defined level, a vapor pressure of the raw material is too high to allow combination of the raw material and the substrate, causing non-uniform adsorption of the raw material in large quantities to the substrate and forming a thick film. When the pressure exceeds the defined level, the vapor pressure of the raw material is decreased, combination of the raw material and the substrate requires a relatively long time and the chamber may encounter safety problems.

Afterward, the chamber is heated to a temperature of less than a level at which the substrate is deformed or begins to melt. Here, if the chamber temperature is too low, diffusion and combination are insufficiently conducted. On the other hand, when the chamber temperature is too high, the substrate is deformed or becomes molten and, even if a phosphor layer is formed by combination of the substrate and the raw material, the phosphor layer is evaporated and causes an alternative reaction, thus not enabling fabrication of a desired thin film phosphor product.

Figure 2:
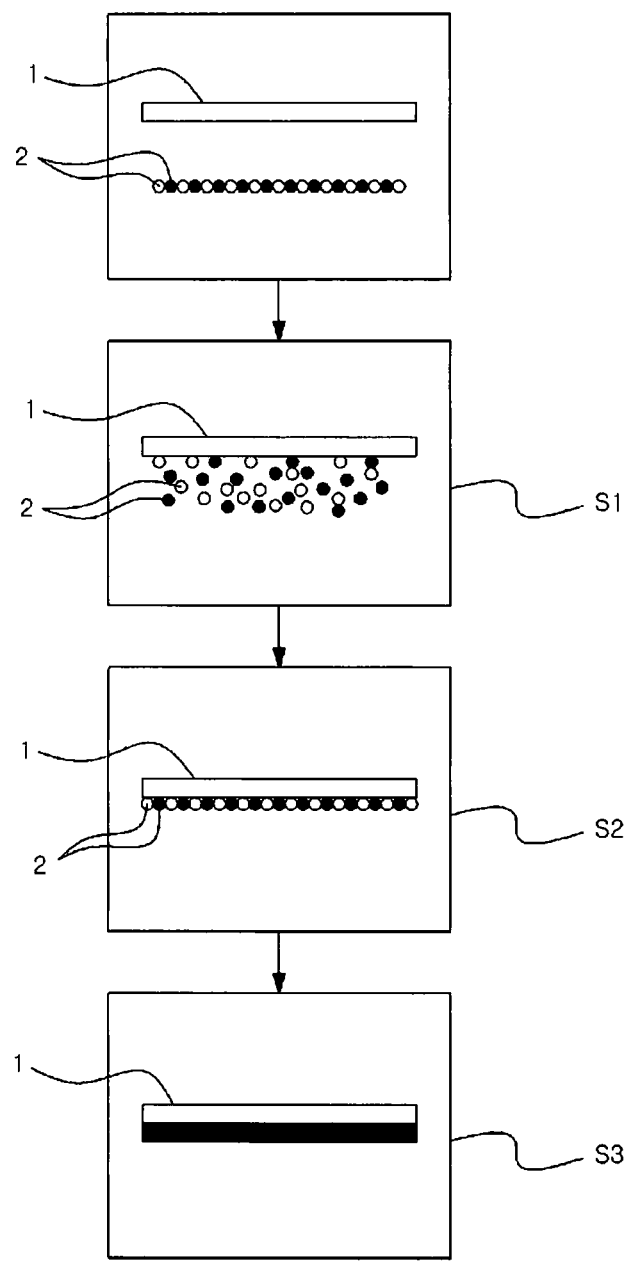
FIG. 2 is a flow chart illustrating a formation mechanism of a thin film phosphor.

With respect to a mechanism for combination of a thin film phosphor with the substrate, the mechanism includes a step of evaporating the raw material out of the chamber (S1), a step of depositing the raw material on the substrate (S2) and a step of diffusing and penetrating the raw material into constitutional elements of the substrate to form the thin film phosphor (S3), as shown in FIG. 2.

The thin film phosphor formation step is continued until a thickness of a phosphor layer from an original surface of the substrate reaches 0.3 to 30 μm. If the thickness is less than the defined level, a uniform film is hardly prepared and shows low luminance. When the thickness exceeds the defined level, a film transparency is deteriorated and a time required for formation of the phosphor layer is undesirably increased although a uniform film is obtained.

The phosphor layer is not only formed on a substrate surface facing the raw material in the chamber but also on a rear face of the substrate. Therefore, if necessary, a thin film phosphor formed on the rear face of the substrate may be utilized. On the other hand, if a thin film phosphor formed on a rear face of the substrate is not required, the thin film phosphor is removed and a thickness of the substrate may be controlled to a desired level by conventional processing such as grinding.

The following description will be given to explain Examples 1 to 3 as exemplary embodiments of a thin film phosphor prepared according to the first combination process.

EXAMPLE 1

$Zn_2SiO_4:Mn^{2+}$ Thin Film Phosphor

ZnO and MnO as a raw material and an amorphous quartz substrate are placed in a chamber of an electric furnace. After exhausting the chamber, a ZnO and MnO power mixture is subjected to gas diffusion and reacts with the amorphous quartz substrate while heating the chamber. The treated material as a sample is naturally cooled and completed into a final $Zn_2SiO_4:Mn^{2+}$ thin film phosphor.

In this case, an initial combination pressure inside the chamber ranges from $10^{-2}$ to $10^{-4}$ Torr and a temperature thereof ranges from 1,000 to 1,200° C. Also, the combination time ranges from 6 to 24 hours. While altering such combination conditions, the thickness of the thin film phosphor (a thickness of the phosphor from an original surface of the substrate before combination) was tested. Tested results are shown in the following Table 4.

TABLE 4

Thickness of phosphor layer from original surface of substrate based on different combination conditions

| | Combination temperature (° C.) | | | | | | |
|---|---|---|---|---|---|---|---|
| | 1000 | 1100 | 1200 | 1200 | 1200 | 1200 | 1200 |
| Combination time (hr) | 6 | 6 | 6 | 12 | 24 | 6 | 6 |
| Initial chamber pressure at combination (Torr) | $10^{-2}$ | $10^{-2}$ | $10^{-2}$ | $10^{-2}$ | $10^{-2}$ | $10^{-3}$ | $10^{-4}$ |
| Thickness of phosphor layer from substrate surface (μm) | 2 | 3 | 4 | 7 | 9 | 10 | 12 |

From TABLE 4, it can be seen that the thickness of the phosphor layer is adjusted by altering a chamber temperature, an initial chamber pressure and/or a combination time. The thickness may be increased with increase in temperature, decrease in pressure and/or extended time for combination.

The initial chamber pressure at combination ranges from $10^{-2}$ to $10^{-6}$ Torr, however, internal pressure of the chamber is increased due to evaporation of the raw material and increase in temperature during combination process. For example, when the initial chamber pressure is $10^{-2}$ Torr, the internal pressure of the chamber at the point of time for combination reaches about 1 atm. Such chamber pressure at the point of time for combination may depend on initial combination pressure and/or types of raw materials.

Figure 3:
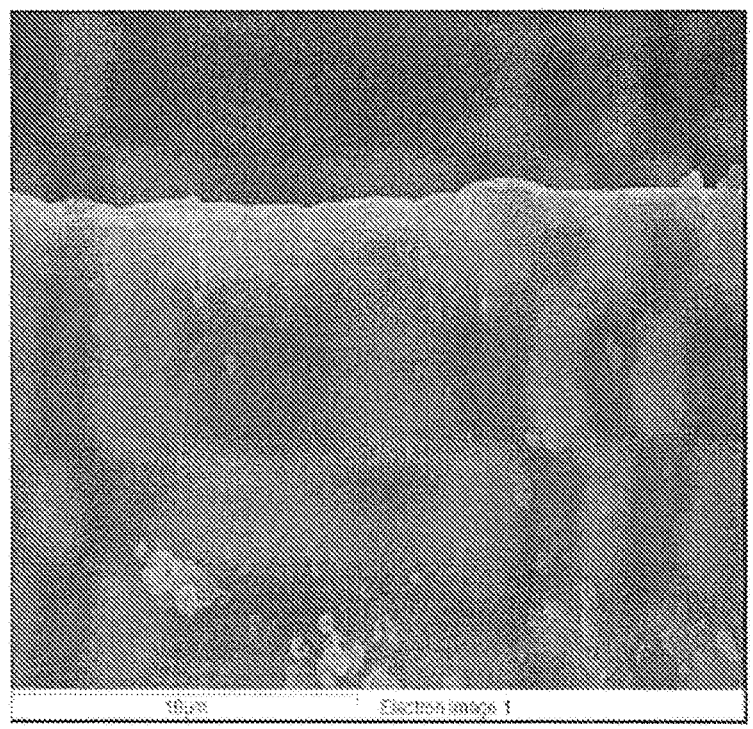
FIGS. 3 to 5 are photographs showing variation in thickness of phosphor layer vs. reaction time of $Zn_2SiO_4$:$Mn^{2+}$ thin film phosphor.
Figure 4:
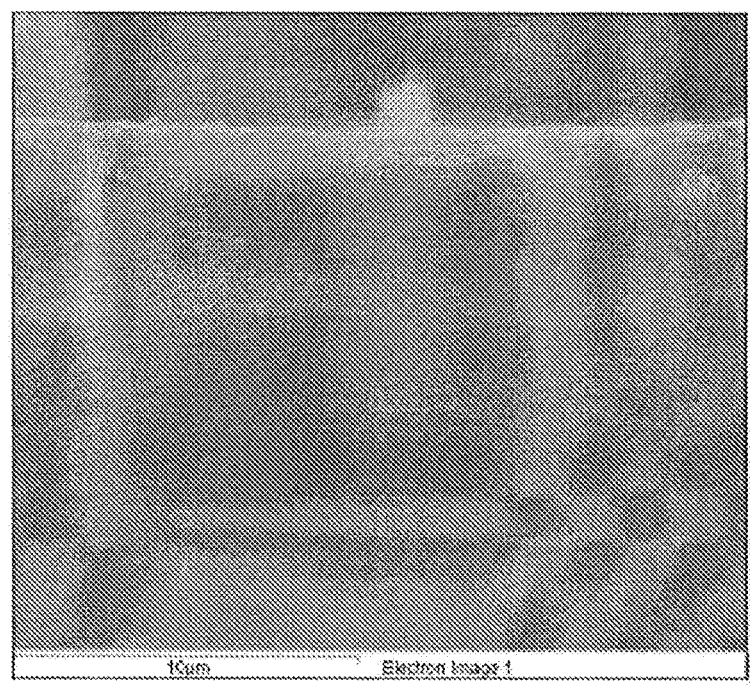
Figure 5:
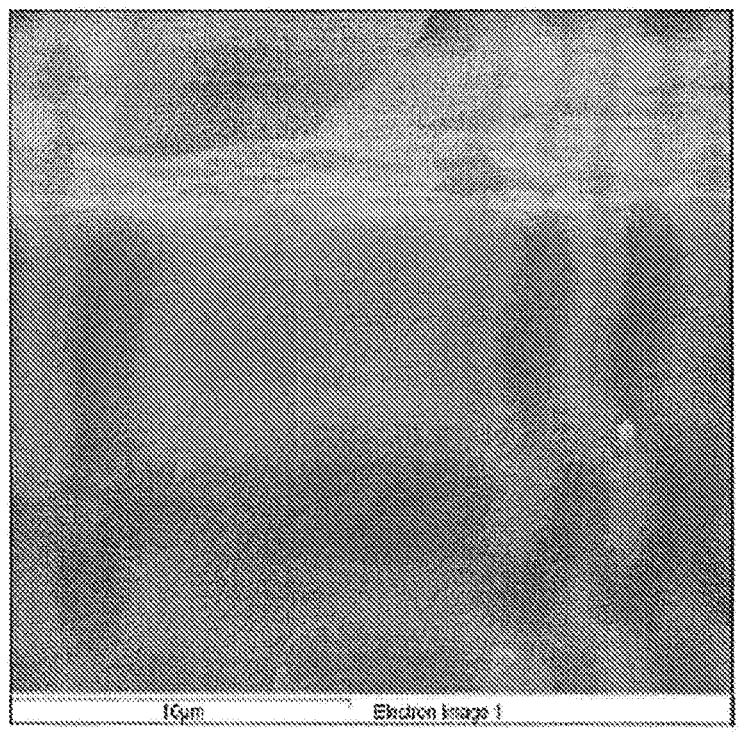

FIGS. 3 to 5 are photographs showing variation in thickness according to a combination time of $Zn_2SiO_4:Mn^{2+}$ thin film phosphor wherein conditions of the phosphor after lapse of 6, 12 and 24 hours as the combination time are illustrated. From the photographs, it can be seen that the raw material deeply penetrates into the substrate with lapse of the combination time.

Figure 6:
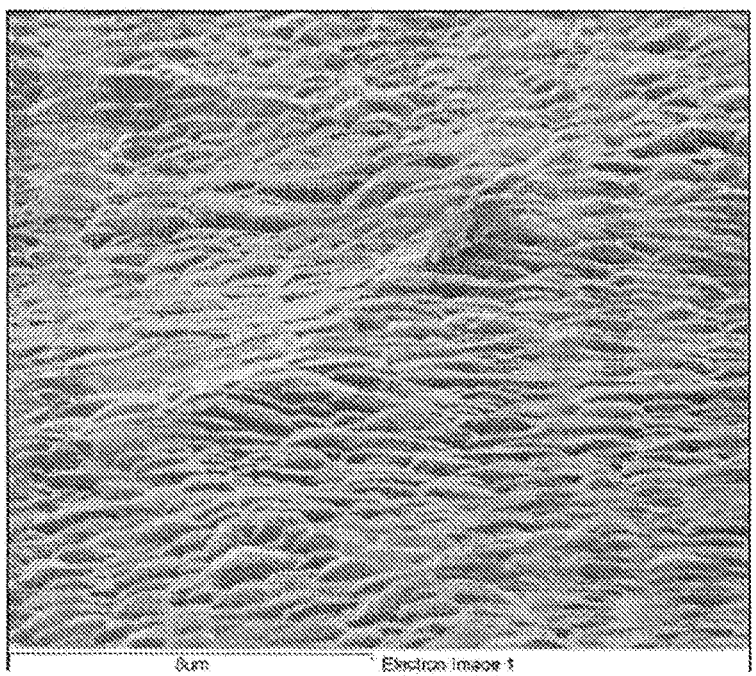
FIG. 6 is a photograph showing a surface of $Zn_2SiO_4$:$Mn^{2+}$ thin film phosphor.

FIG. 6 is an electron microscopic photograph showing a surface of $Zn_2SiO_4:Mn^{2+}$ thin film phosphor. The surface of the thin film phosphor shows convex lens pattern in an unevenness form having a size of 1 to 10 μm. Such convex lens pattern serves as a convergent lens for absorption light and reflected light, enhancing luminance.

Figure 7:
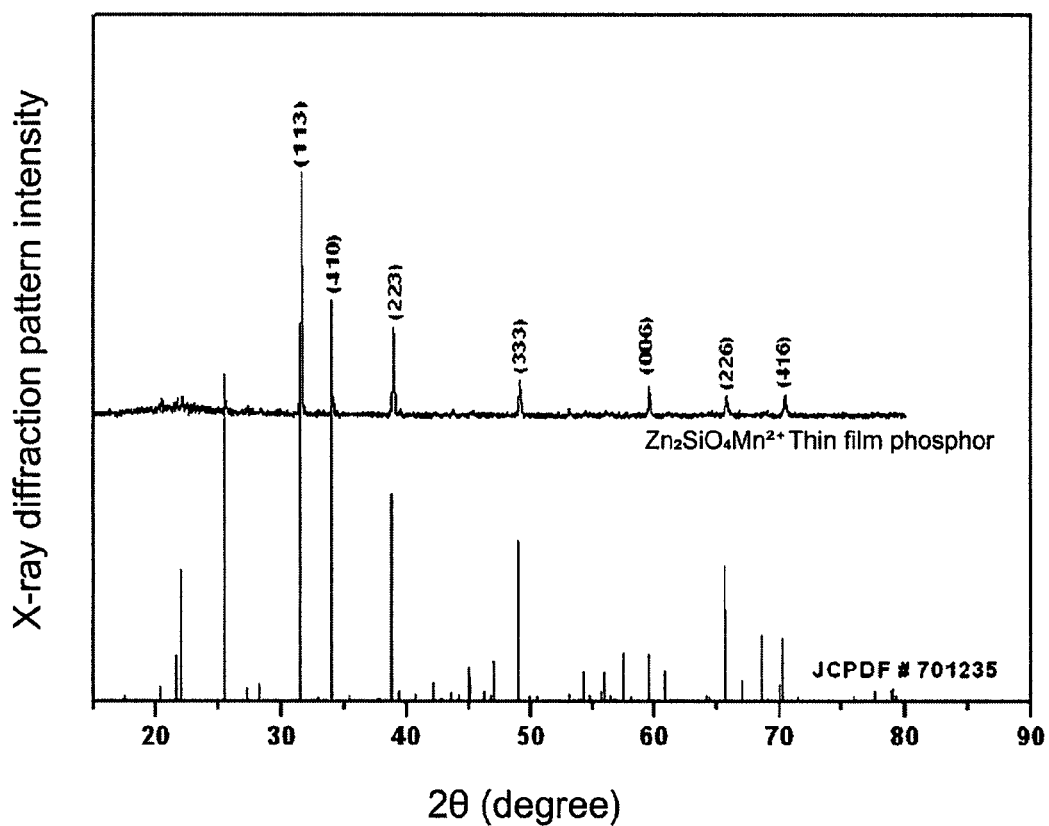
FIG. 7 is a graph illustrating X-ray diffraction pattern of $Zn_2SiO_4$:$Mn^{2+}$ thin film phosphor.

FIG. 7 is a graph illustrating X-ray diffraction pattern of $Zn_2SiO_4:Mn^{2+}$ thin film phosphor. Compared to JCPDF #701235 file describing the X-ray diffraction pattern of $Zn_2SiO_4$, the inventive thin film phosphor has substantially the same crystal structure as that of the compared material and, especially, a single crystal orientation is restricted. In other words, it can be seen that peaks in crystal orientations (113), (223) and (333) which are defined according to Miller index in X-ray diffraction pattern are more than 80% of total peaks. This result demonstrates growth of anisotropic texture and is to be because overall energy of a system is reduced by vibration as Zn with $SiO_2$ to produce $Zn_2SiO_4$.

Figure 8:
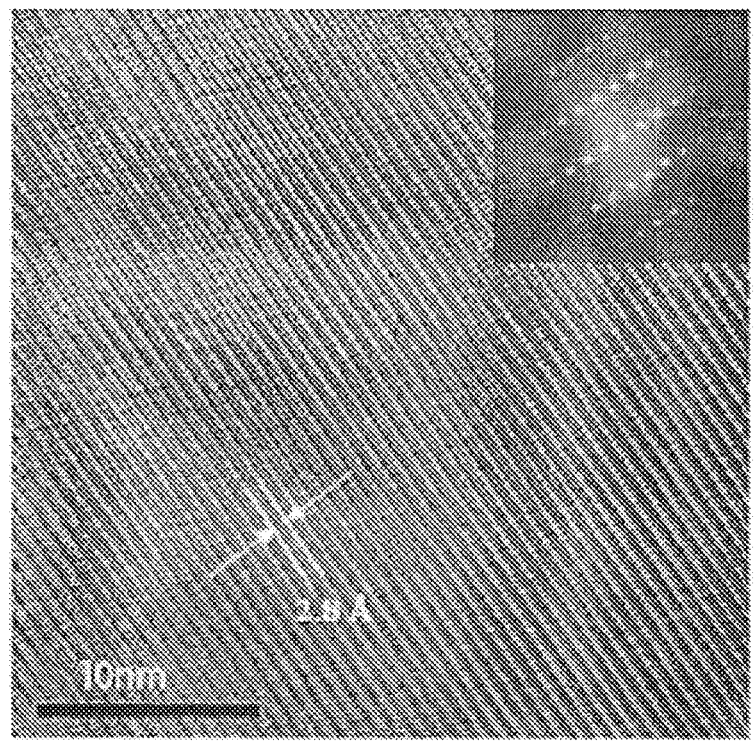
FIG. 8 is TEM image and an electron spectroscopic pattern of $Zn_2SiO_4$:$Mn^{2+}$ thin film phosphor.

FIG. 8 is TEM image and an electron spectroscopic pattern of $Zn_2SiO_4:Mn^{2+}$ thin film phosphor. A crystal lattice constant is about 2.8 Å showing a constant in a crystal orientation (113). This result corresponds to X-ray diffraction pattern predominant in the crystal orientation (113) shown in FIG. 5. Consequently, it is determined that the inventive thin film phosphor is a single crystal type phosphor. In contrast to conventional polycrystalline powder phosphors which are opaque due to light scattering at a crystal boundary, a thin film phosphor of the present invention is transparent since light scattering effects of absorbed light are restricted due to single crystal characteristics.

Figure 9:
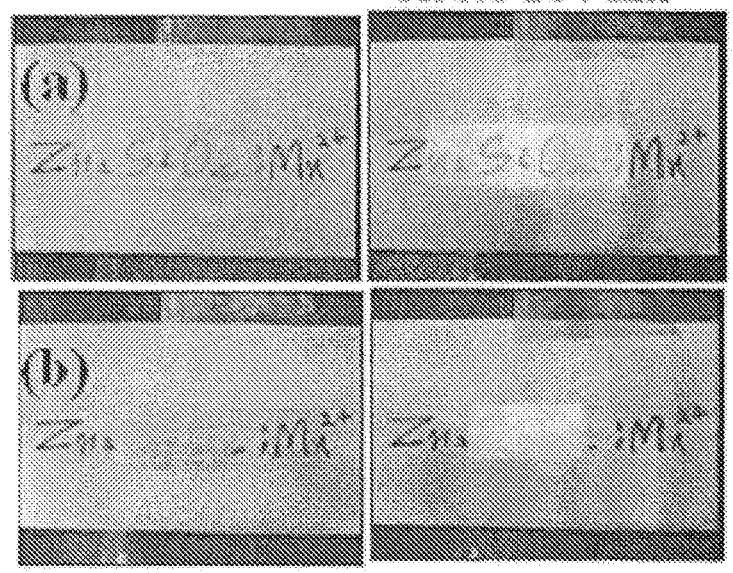
FIG. 9 is photographs showing real images of $Zn_2SiO_4$:$Mn^{2+}$ thin film phosphor and powder phosphor.

FIG. 9 is photographs showing (a) a thin film phosphor of the present invention and (b) a conventional powder phosphor, in order to compare transmission rates of the foregoing phosphors before and after excitation using a light source at 254 nm. It was found that the inventive thin film phosphor had a transmission rate of about 50% which is remarkably improved, compared to the conventional powder phosphor.

As illustrated in FIGS. 6 to 9, a thin film phosphor of the present invention does not have a discontinuous boundary at which boundary characteristics are drastically varied around the thin film phosphor and a substrate, thus not generating a light interference pattern or causing light reflection. Therefore, the inventive thin film phosphor is clearly different from conventional thin film phosphors. That is, for the thin film phosphor of the present invention, boundary characteristics at a boundary between the phosphor and the substrate are continuously varied, thus inhibiting formation of a boundary face. As a result, the thin film phosphor has improved transmission rate.

Compared to the conventional powder phosphor having a polycrystalline structure, the thin film phosphor of the present invention has a single crystal-like structure with limited crystal orientation. More particularly, the thin film phosphor of the present invention has limited crystal orientations of 2 to 10 which are defined according to Miller index X-ray diffraction pattern. Accordingly, since light scattering on surface of a powder phosphor or at a crystal boundary thereof is not monitored in the inventive thin film phosphor, the present invention may accomplish improvement of light transmission and/or luminance.

Figure 10:
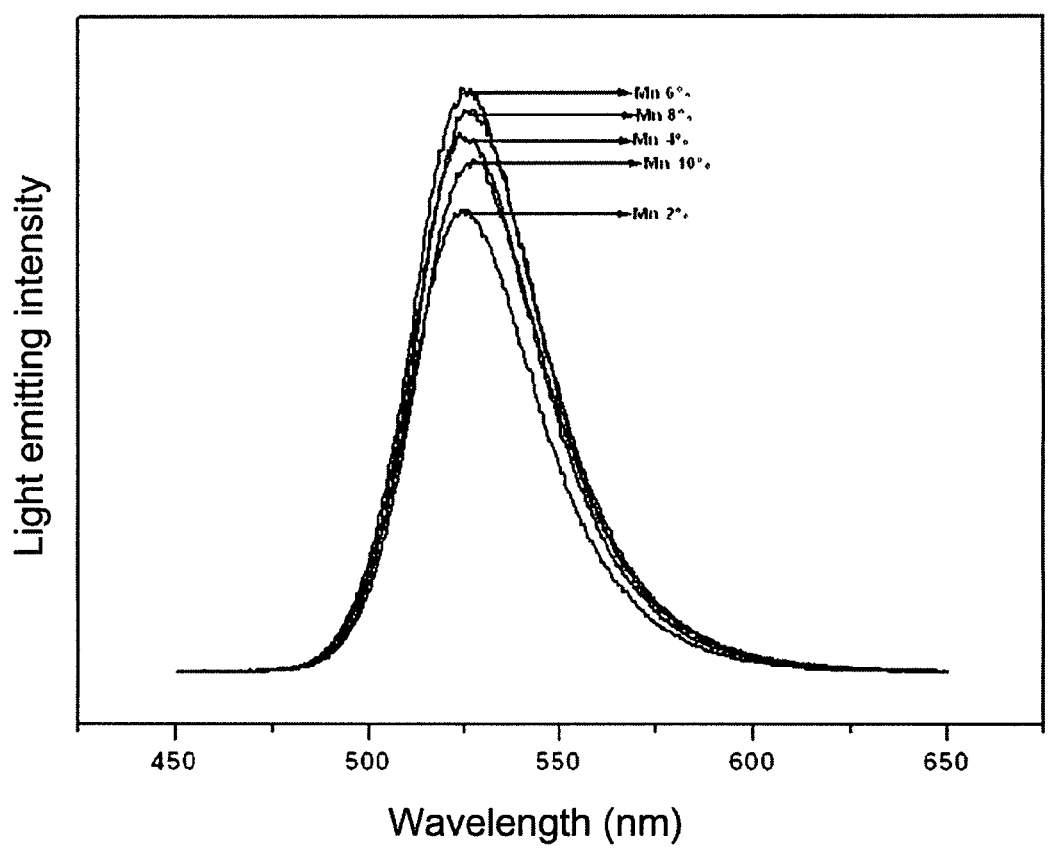
FIG. 10 is a graph illustrating light emission intensity of $Zn_2SiO_4$:$Mn^{2+}$ thin film phosphor at different Mn concentrations.

FIG. 10 is a graph illustrating light emission intensities of $Zn_2SiO_4:Mn^{2+}$ thin film phosphor according to variation in Mn concentration of the phosphor (wherein a relative ratio in atomic amount of ZnO to MnO is adjusted to 2%, 4%, 6%, 8% and 10%), especially, using an excitation light source at 254 nm.

As shown in these graphs, as the Mn concentration increases from 2% to 6%, the light emission intensity is increased. However, with increase of the Mn concentration from 8% to 10%, an increase of light extinction may occur. Therefore, it can be seen that the light emission intensity is controlled according to a constitutional composition of the raw material.

Figure 11:
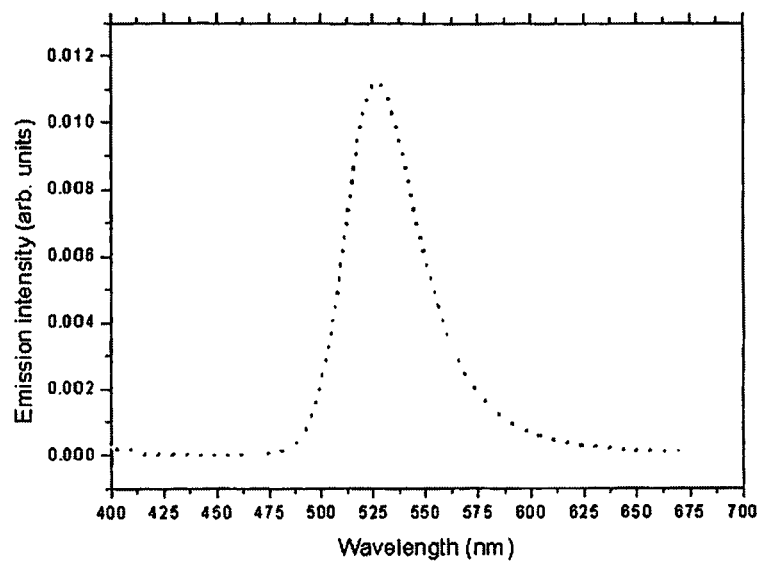
FIG. 11 is a graph illustrating light emission intensity of $Zn_2SiO_4$:$Mn^{2+}$ thin film phosphor by an excitation light source at 255 nm, compared to a powder phosphor.

FIG. 11 is a graph illustrating a relative light emission intensity of $Zn_2SiO_4:Mn^{2+}$ thin film phosphor obtained by an excitation light source at is 255 nm, compared to a powder phosphor. The light emission intensity of the inventive $Zn_2SiO_4:Mn^{2+}$ thin film phosphor is about 90% of that of a commonly used powder phosphor (with light emission intensity of 500 cd/m$^2$) that has the same constitutional elements and a high thickness formed on a substrate by a silk screen method. Further, compared to a typical thin film phosphor having a light emission intensity of 100 cd/m$^2$ formed by sputtering, the inventive thin film phosphor has a light emission intensity of about 200% of that of the typical thin film phosphor. Therefore, it is believed that the thin film phosphor of the present invention shows excellent light emission intensity substantially equal to those of conventional powder phosphors. This result is obtained because a refractive index of the substrate more closely matches that of the thin film phosphor, thus reducing total internal reflection. More particularly, a refractive index of $Zn_2SiO_4$ thin film phosphor penetrated and diffused into the substrate is about 1.6 which is substantially an average value of a relative index of $Zn_2SiO_4$ on a surface of the thin film phosphor (1.7) and another relative index of a quartz substrate (1.5), thereby embodying a continuous structure of the substrate and the thin film phosphor without a boundary therebetween. The thin film phosphor of the present invention exhibits remarkably enhanced external light emission, compared to a conventional thin film phosphor having external light emission deteriorated due to total internal reflection caused by a difference between the substrate and a phosphor film.

Figure 12:
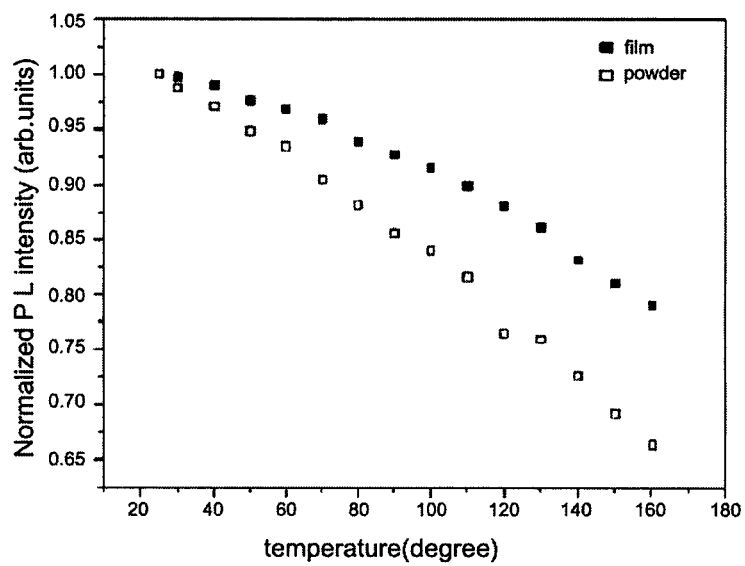
FIG. 12 is a graph illustrating thermal characteristics of $Zn_2SiO_4$:$Mn^{2+}$ thin film phosphor, compared to the powder phosphor.

FIG. 12 is a graph illustrating thermal characteristics of $Zn_2SiO_4:Mn^{2+}$ thin film phosphor, compared to powder phosphor. As shown in the graphs, it can be seen that the inventive thin film phosphor (■) has excellent thermal characteristics, compared to the conventional powder phosphor (□). This is because the thin film phosphor of the present invention has a single crystal structure with predominant crystal orientation (113), contrary to conventional polycrystalline powder phosphors. In other words, the conventional polycrystalline powder phosphor shows inhibited heat transfer and/or discharge at a boundary between powders, whereas the inventive thin film phosphor is only an agglomerate of single crystals with limited crystal orientation which in turn exhibits superior heat transfer and discharging properties, thereby reducing light extinction for luminance based on temperature.

EXAMPLE 2

$BaSi_2O_5:Eu^{2+}$ Thin Film Phosphor

BaO and $Eu_2O_3$ as a raw material and a quartz substrate are prepared and a green emitting $BaSi_2O_5:Eu^{2+}$ thin film phosphor is fabricated according to the same procedures in Example 1.

In this case, after exhausting the chamber under a pressure of $10^{-4}$ Torr, the raw material is diffused in a gas state into at 1,200° C., followed by conducting reaction of the raw material with the substrate for 6 hours. Then, the treated material is naturally cooled and completed into a final thin film phosphor.

The obtained thin film phosphor has a thickness of 3 μm and a relative luminance of 86% in comparison to a powder phosphor.

EXAMPLE 3

$ZnAl_2O_4:Mn^{2+}$ Thin Film Phosphor

ZnO and MnO as a raw material and a sapphire ($Al_2O_3$) substrate are prepared and a green emitting $ZnAl_2O_4:Mn^{2+}$ thin film phosphor is fabricated according to the same procedures in Example 1.

In this case, after exhausting the chamber to a pressure of $10^{-2}$ Torr, the raw material is diffused in a gas state into at 1,000° C., followed by conducting reaction of the raw material with the substrate for 6 hours. Then, the treated material is naturally cooled and completed into a final thin film phosphor.

The obtained thin film phosphor has a thickness of 2 μm and a relative luminance of 80% in comparison to a powder phosphor.

2) Second Combination Process

In contrast to the foregoing first combination process, a second combination process of forming a raw material on a substrate according to the present invention includes depositing the raw material on a surface of the substrate then heating the substrate having the raw material deposited thereon, as a post-treatment.

The deposition process may include, for example, sputtering, pulse laser deposition, chemical vapor deposition, MBE, wet processing (spin-coating, dip coating), and the like. In the present embodiment, sputtering was selected. The following description will be given to explain Examples 4 to 7 as exemplary embodiments of a thin film phosphor prepared according to the second combination process.

EXAMPLE 4

$BaSi_2O_5:Eu^{2+}$ Thin Film Phosphor

A quartz substrate, BaO as a raw material, and $0.05Eu_2O_3$ as a sputtering target are placed in a chamber.

The substrate is firstly subjected to ultrasonic cleaning with acetone, methanol and distilled water in this order, respectively, for five minutes. After fixing the cleaned substrate to a substrate holder of a sputtering deposition apparatus, the chamber is exhausted to reach an initial pressure of $10^{-6}$ Torr.

A gas used in the sputtering process includes argon and oxygen wherein $O_2$ partial pressure is about 50% of a total pressure. The sputtering process is performed under a pre-determined working pressure of $10^{-2}$ Torr and a pre-determined sputtering power of 100 W, until a desired deposition thickness is obtained.

Afterward, the raw material is diffused into the substrate by thermal diffusion at 1,000° C. and reacts with constitutional elements of the substrate. As a result, a green emitting $BaSi_2O_5:Eu^{2+}$ thin film phosphor is obtained as a final product.

Figure 13:
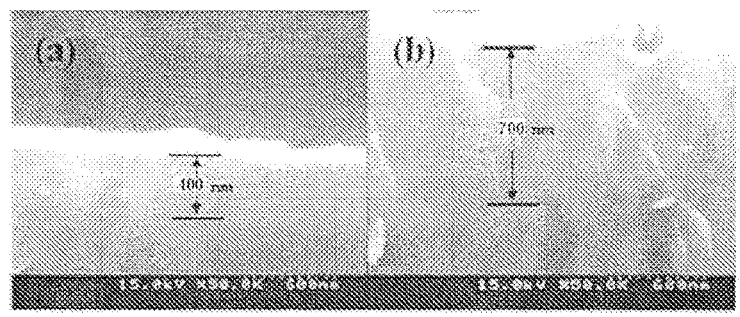
FIG. 13 is SEM photographs showing $BaSi_2O_5$:$Eu^{2+}$ thin film phosphor before and after thermal diffusion.

FIG. 13 is SEM photographs showing $BaSi_2O_5:Eu^{2+}$ thin film phosphor before and after thermal diffusion and, in particular, FIG. 13(a) exhibits a BaO:Eu thin film deposited on the substrate before thermal diffusion while FIG. 13(b) is an SEM photograph showing a $BaSi_2O_5:Eu^{2+}$ thin film phosphor after thermal diffusion at 1,000° C. From these photographs, it was found that the BaO:Eu thin film has a thickness of 400 nm while the $BaSi_2O_5:Eu^{2+}$ thin film phosphor exhibits a thickness of 700 nm, as estimated to a point at which a constitutional composition of the phosphor is decreased to half its original level.

Figure 14:
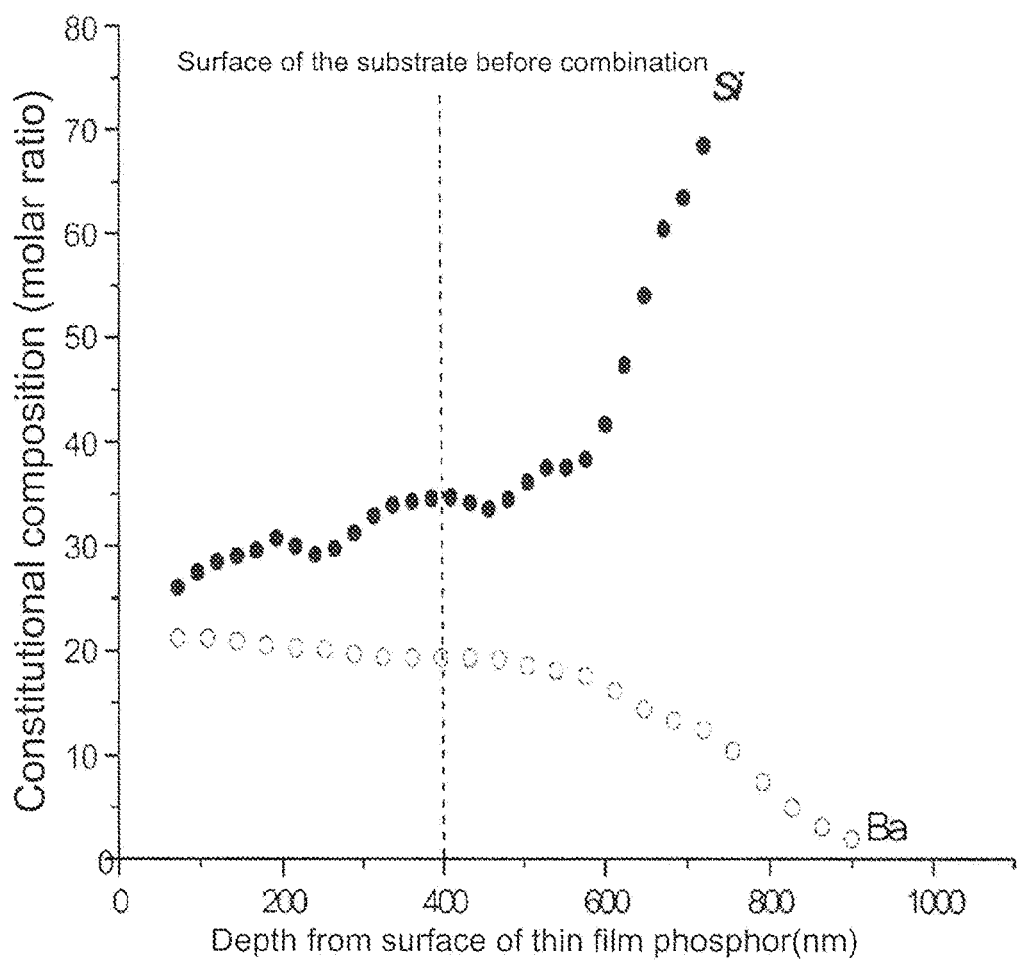
FIG. 14 is a graph illustrating variation in constitutional composition of a thin film phosphor prepared in Example 4 ($BaSi_2O_5$:$Eu^{2+}$) vs. depth of phosphor determined by XPS.

FIG. 14 is a graph illustrating variations in content ratios of Ba and Si, respectively, as constitutional elements of the thin film phosphor prepared in Example 4 ($BaSi_2O_5:Eu^{2+}$ heated at 1,000° C.) vs. depth of the phosphor determined by XPS. According to these graphs, it can be seen that a constitutional composition of the thin film phosphor is continuously varied at a boundary between the thin film phosphor and the substrate. That is, although the BaO:Eu thin film has a thickness of 400 nm before heat treatment, a constitutional composition of the thin film phosphor approaches a constitutional composition of the substrate along a depth of the substrate as constitutional elements of the thin film phosphor are gradually diffused into the substrate by heat treatment by diffusion. Therefore, it is determined that physical properties of the thin film phosphor according to the present invention, such as crystal structure, refractive index, etc., are continuously varied, thus inhibiting light scattering and/or light interference at a boundary and improving a transmission rate.

Figure 15:
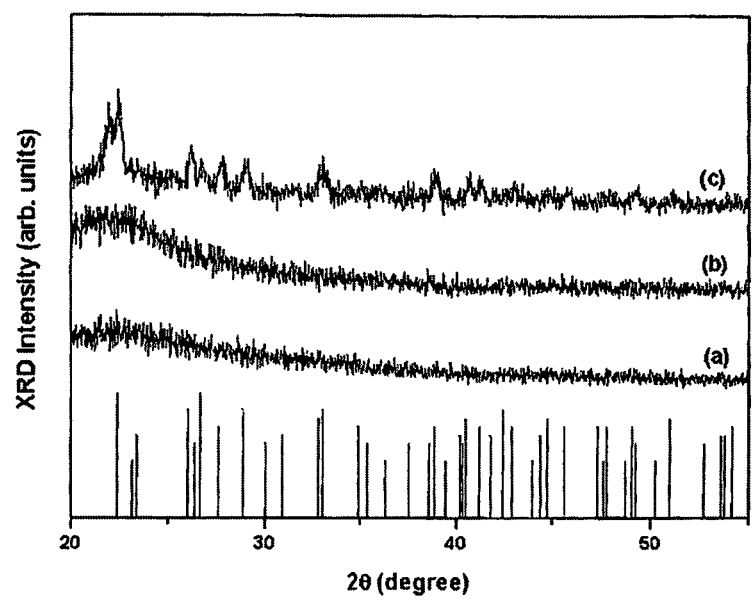
FIG. 15 is photographs showing X-ray diffraction pattern of $BaSi_2O_5$:$Eu^{2+}$ thin film phosphor vs. heat treatment temperature.

FIG. 15 is photographs showing X-ray diffraction pattern of $BaSi_2O_5:Eu^{2+}$ thin film phosphor vs. heat treatment temperature. It was found that, when the heat treatment temperature elevates to (a) 1,000° C., (b) 1,100° C. and (c) 1,200° C., crystallinity of the thin film phosphor is improved.

Figure 16:
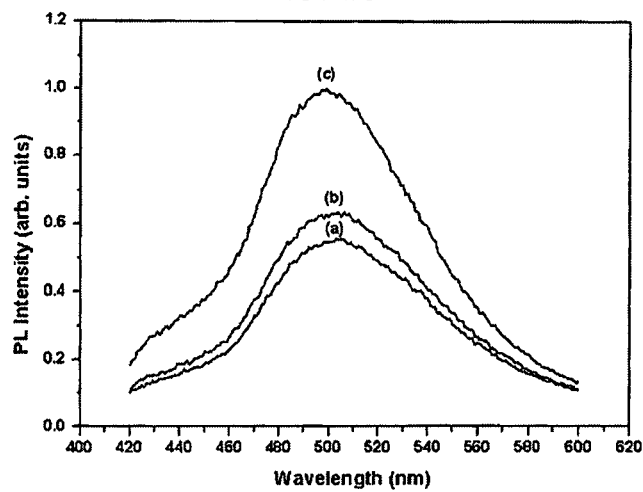
FIG. 16 is a graph illustrating photo-luminescent (PL) intensity of $BaSi_2O_5$:$Eu^{2+}$ thin film phosphor by excitation at 365 nm vs. heat treatment temperature.

FIG. 16 is a graph illustrating photo-luminescent (PL) intensity of $BaSi_2O_5:Eu^{2+}$ thin film phosphor by excitation at 365 nm vs. heat treatment temperature. It was found that, when the heat treatment temperature elevates to (a) 1,000° C., (b) 1,100° C. and (c) 1,200° C. using an excitation light source at 365 nm, PL intensity of the thin film phosphor is increased. Luminance of the fabricated $BaSi_2O_5:Eu^{2+}$ thin film phosphor according to the present invention exhibits 200% of that of a typical thin film phosphor fabricated by conventional process, and is close to 80% of that of a commercially available powder.

Like the thin film phosphor fabricated according to the first combination process, the thin film phosphor obtained by the second combination process also shows a constitutional composition continuously varied at a boundary between the substrate and the thin film phosphor. This result is believed to be because a refractive index the substrate matches with that of the thin film phosphor, thus reducing light loss.

EXAMPLE 5

$Zn_2SiO_4:Mn^{2+}$ Thin Film Phosphor

ZnO and 0.05 MnO as a raw material and an amorphous quartz substrate are prepared and a green emitting $Zn_2SiO_4:Mn^{2+}$ thin film phosphor is fabricated according to the same procedures in Example 4.

As a result, thin film properties as described in Example 4 are attained. The obtained thin film phosphor has a thickness of 700 m, a transmission rate of about 6% and a relative luminance of 35% to a powder phosphor.

EXAMPLE 6

$ZnAl_2O_4:Mn^{2+}$ Thin Film Phosphor

ZnO and 0.005 MnO as a raw material and an $Al_2O_3$ substrate are prepared and a green emitting $ZnAl_2O_4:Mn^{2+}$ thin film phosphor is fabricated according to the same procedures in Example 4. As a result, thin film properties as described in Example 4 are attained.

EXAMPLE 7

$Zn_2SiO_4:Mn^{2+}$ Thin Film Phosphor

A ZnO:Mn sol-gel solution as a raw material to be applied to an amorphous quartz substrate by spin-coating is prepared. The ZnO:Mn sol-gel solution is prepared by dissolving $Zn(CH_3COO)_2 2H_2O$ and $Mn(CH_3COO)_4 H_2O$ in isopropyl alcohol and agitating the mixture to obtain a transparent solution. Here, a concentration of Mn to Zn is 0.05 mol while a concentration of the solution is 1M.

After depositing a ZnO:Mn thin film on the quartz substrate by spin-coating, the deposited substrate is heated under air to react the substrate with the ZnO:Mn thin film, thereby producing a $Zn_2SiO_4:Mn^{2+}$ thin film phosphor. The spin-coating is conducted by rotating the substrate at 3,000 rpm for 20 seconds.

Figure 17:
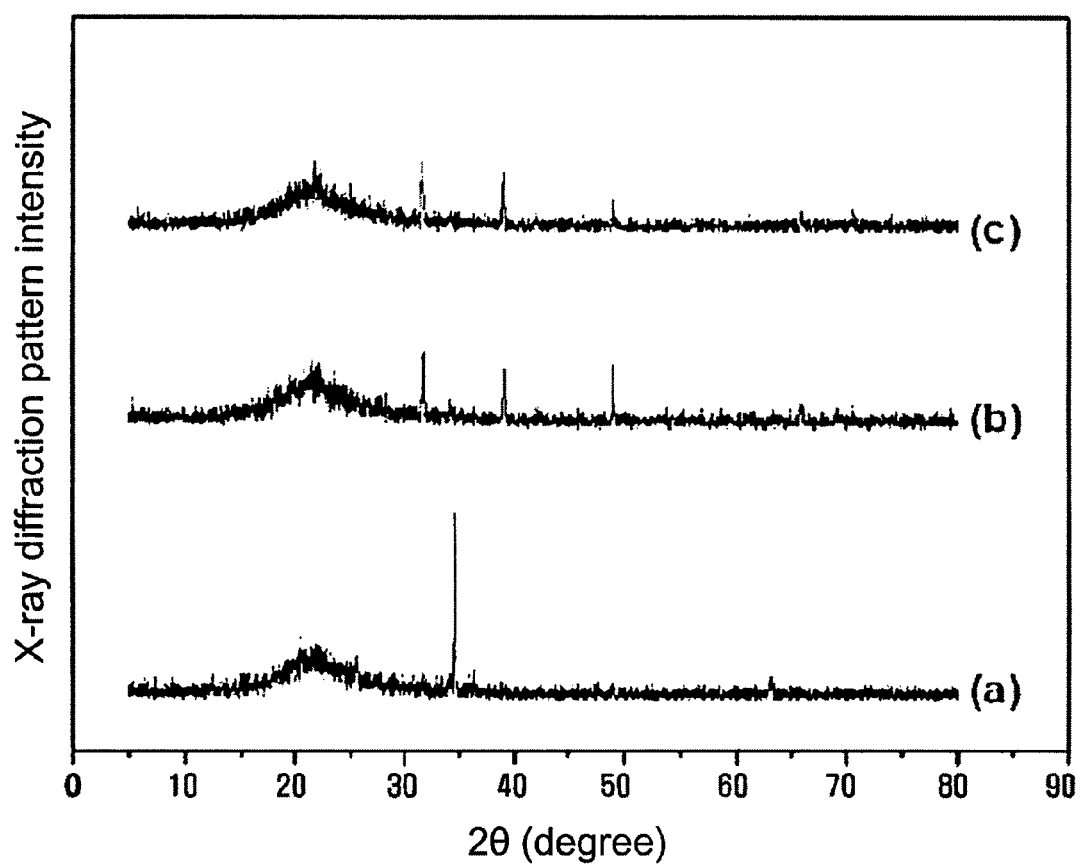
FIG. 17 is a graph illustrating X-ray diffraction pattern of $Zn_2SiO_4$:$Mn^{2+}$ thin film phosphor prepared by spin-coating.

FIG. 17 is a graph illustrating X-ray diffraction pattern of $Zn_2SiO_4:Mn^{2+}$ thin film phosphor prepared by spin-coating, while varying a heat treatment temperature to (a) 1,000° C., (b) 1,100° C. and (c) 1,200° C. It was found that, when the heat treatment temperature elevates from 1,000° C. to 1,100° C., the ZnO crystal structure is transferred into a $Zn_2SiO_4$ crystal structure. Luminance of the fabricated $Zn_2SiO_4:Mn^{2+}$ thin film phosphor is close to 50% of that of a commercially available powder phosphor.

Figure 18:
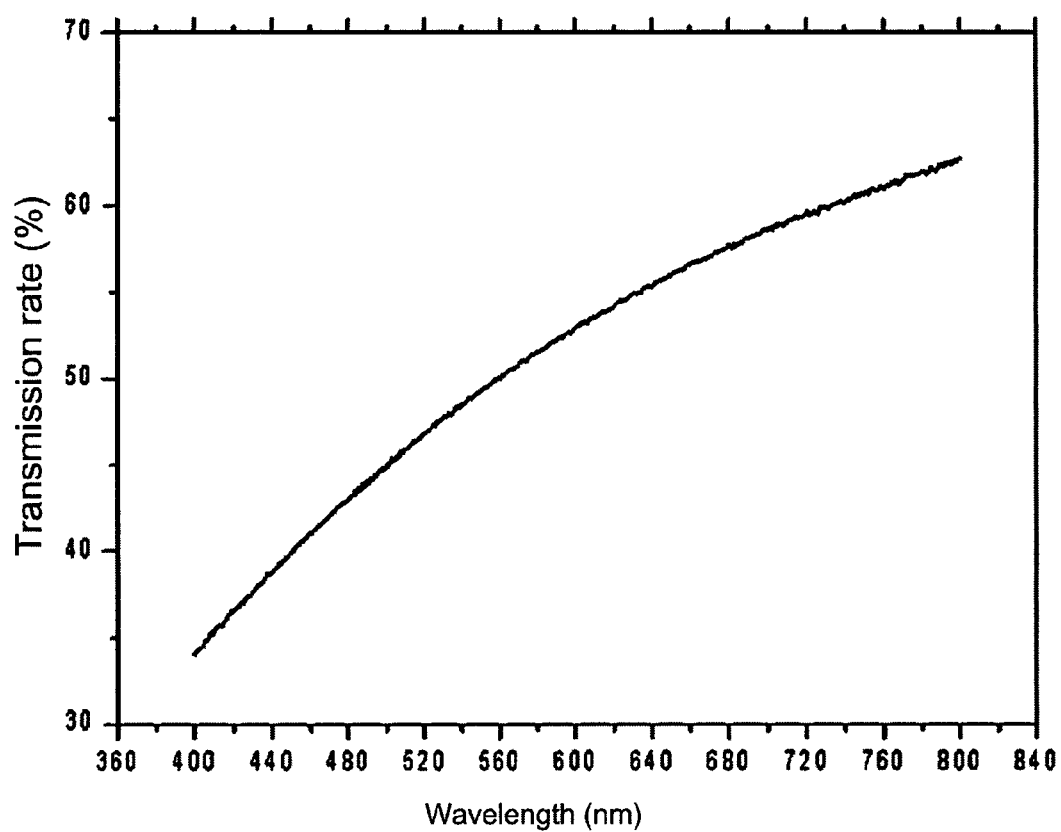
FIG. 18 is a graph illustrating transmission rate of $Zn_2SiO_4$:$Mn^{2+}$ thin film phosphor prepared by spin-coating vs. wavelength thereof.

FIG. 18 is a graph illustrating transmission rate of a $Zn_2SiO_4:Mn^{2+}$ thin film phosphor prepared by spin-coating vs. wavelength thereof. This thin film phosphor shows a transmission rate of about 60% which is similar to that of a general glass. In particular, since a constitutional composition is continuously varied due to thermal diffusion at a boundary between the substrate and the thin film phosphor, an interference pattern usually occurring at the boundary is not observed in the present invention.

With respect to a thin film phosphor of the present invention having a phosphor layer obtained as a final product by reacting a substrate material with a raw material, a constitutional material of the phosphor layer as well as the raw material and the substrate material have substantially the same or similar structure. Based on this feature, the final product, that is, the phosphor layer shows excellent crystal growth and has improved light emitting properties by adding an activating agent such as Mn or Eu to the product. This result is based on a principle that a chemical activation energy consumed for re-alignment of lattice is minimized in a reaction of different two materials having similar structures to produce a third compound having the similar structure (hereinafter, referring to as 'similar structure principle').

According to the similar structure principle, the thin film phosphor fabricated in Example 5 is described in detail below. As a substrate, an amorphous quartz plate has a slightly irregular hexagonal ring structure. Also, powder or liquid ZnO:Mn as a raw material has an amorphous structure which may be altered into a hexagonal structure by heat treatment at about 900° C. A final product, that is, $Zn_2SiO_4$:Mn has a regular hexagonal ring structure of crossing Zn and Si.

That is, it may be represented by: substrate SiO (hexagonal-like)+raw material ZnO:Mn (with hexagonal structure at a high temperature of about 900° C.)→final product $Zn_2SiO_4$:Mn (with hexagonal structure after heat treatment at about 1,200° C.).

According to the foregoing similar structure principle, other thin film phosphors of the present invention may also be represented by:

substrate $SiO_2$ (hexagonal-like)+raw material BaO:Eu (with hexagonal structure at a high temperature of about 1,000° C.)→final product $BaSi_2O_5$:Mn (with hexagonal structure after heat treatment at about 1,200° C.): bright green color emission with a peak at 505 nm by UV radiation at 256 nm;

substrate $SiO_2$ (hexagonal-like)+raw material BaO—$Al_2O_3$:Eu (each of BaO and $Al_2O_3$ having a hexagonal structure at a high temperature of about 1,000° C. or, otherwise, being converted into a hexagonal $BaAl_2O_4$ by a partial reaction of BaO with $Al_2O_3$)→final product $BaAl_2Si_2O_5$:Eu (with hexagonal structure after heat treatment at about 1,200° C.): bright green color emission;

substrate $Al_2O_3$ (single crystal or polycrystalline hexagonal)+raw material BaO:Eu (with hexagonal structure at a high temperature of about 1,000° C.)→final product $BaAl_2O_4$:Eu (with hexagonal structure after heat treatment at about 1,200° C.): green color emission of final product;

substrate $Al_2O_3$ (hexagonal)+raw material $Si_3N_4$:Eu (with hexagonal structure at a high temperature of about 1,300° C.)→final product SiAlON:Eu (with hexagonal structure after heat treatment at about 1,600° C., especially, being converted into reductive atmosphere at 1,200° C. after oxidation under oxygen atmosphere): yellow-red color emission by absorption of blue color at 460 nm; and substrate $Al_2O_3$+raw material BaO—MgO:Eu→final product $BaMgAl_{10}O_{17}$:Eu.

In general, it is expected that using a polycrystalline substrate or an amorphous substrate may form polycrystalline or amorphous crystals based on structure of the substrate. However, a thin film phosphor of the present invention shows "texture" structure with limited crystal growth orientation. Accordingly, light emitting properties of the thin film phosphor are clearly distinguishable from those of typical phosphors having polycrystalline structures. More particularly, a decay time of an activating agent (an inverse decay time is proportional to electron transfer probability and in turn directly effects luminance) is noticeably reduced, thus attaining excellent light emitting properties. Further, according to a heat treatment temperature, texture extent is increased which in turn increases the inverse decay time in association with the degree of texture. Especially, a decay time of Mn used as the activating agent is too long, thus limiting use of Mn as a display phosphor material. However, according to the present invention, Mn shows considerably reduced decay time of about 1.5 ms (a time taken for decreasing an original luminance by 1/10).

Figure 19:
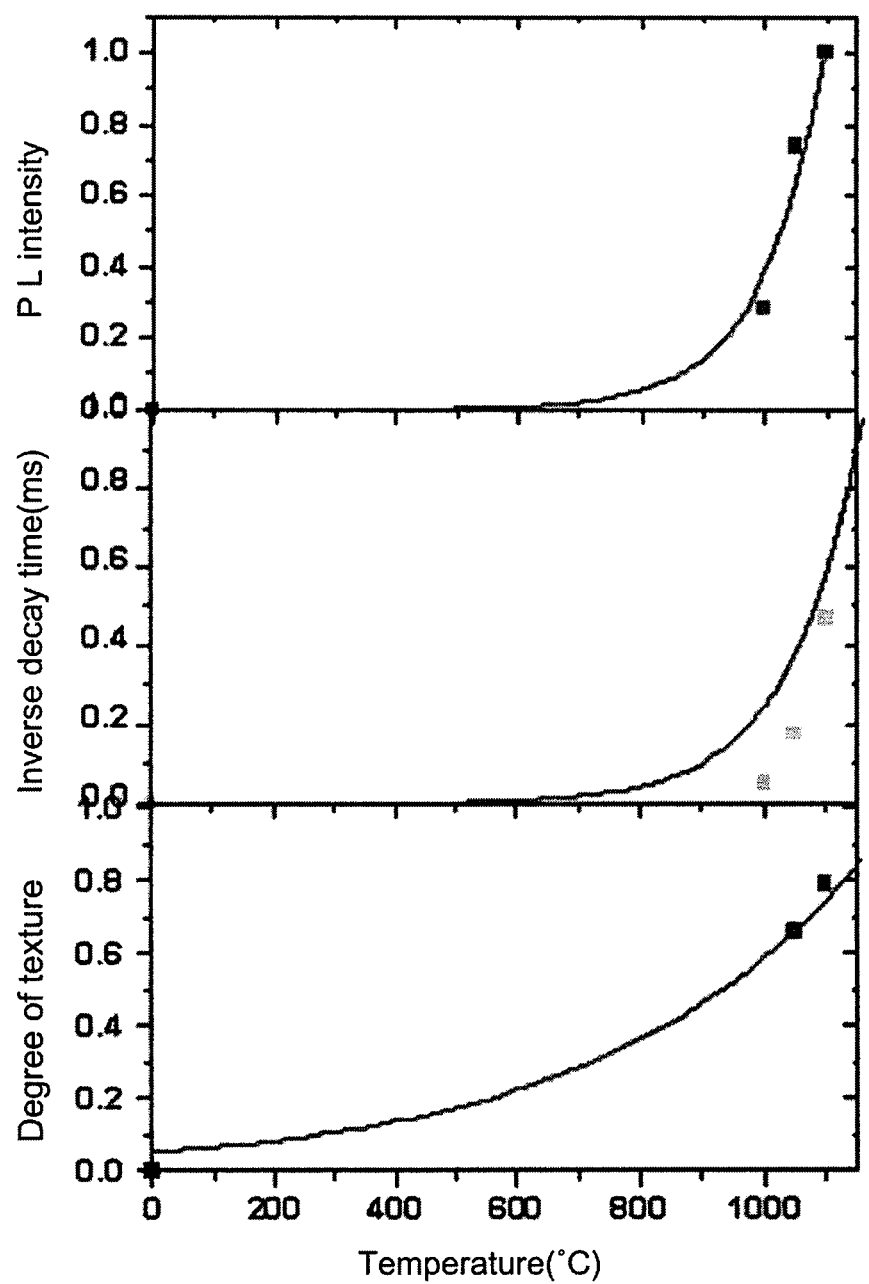
FIG. 19 is a graph illustrating luminance (PL intensity), reciprocal number of a decay time (inverse decay time) and texture extent (degree of texture) of a thin film phosphor prepared in Example 5 vs. heat treatment temperature.

FIG. 19 is a graph illustrating PL intensity, inverse decay time and degree of texture in crystal orientation (113) of a thin film phosphor prepared in Example 5 vs. heat treatment temperature. Crystals in a desired phosphor were partially grown at the heat treatment temperature of 1,000° C., therefore, the texture extent was not defined.

The texture extent may be defined by the following equation:

Texture extent in orientation (113)=$I(113)/[I(113)+I(410)]$ wherein I(113) and I(410) are normal luminance values based on Miller indices (113) and (410), respectively, in X-ray diffraction.

3. Formation of Transparent Layer

After the combination described above, a transparent layer formation process of applying a transparent material to a surface of a phosphor layer having unevenness may be optionally conducted.

The transparent material may include transparent vinyl materials such as polyacryl, polyimide, PETs, etc. Such transparent material may be coated by laminating, screen-printing, spraying, etc. If the transparent layer is added, a transparent thin film phosphor may be obtained by eliminating opacity due to light scattering, while protecting the thin film phosphor.

4. Product Having Thin Film Phosphor

As products manufactured by the inventive method for formation of a thin film phosphor, an EL device, an emergency exit display device and a decorative crystal cup are described in detail below.

EXAMPLE 8

EL Device Having Silicon Substrate

1) A top of an n-type silicon substrate is subjected to heat treatment at 1,100° C. for 2 hours under oxygen atmosphere to produce an oxidized $SiO_2$ layer with a thickness of 1,000 nm.

2) A ZnO:Mn sol solution is applied to the $SiO_2$ layer by spin-coating to form a coating layer with a thickness of 1,000 nm.

3) The prepared ZnO:Mn/$SiO_2$ undergoes reaction at 1,200° C. for 3 hours. Here, 95% $H_2/N_2$ gas is added to the reaction and $Zn_2SiO_4$:$Mn^{2+}$ is formed on the top of the silicon substrate while maintaining 1 atm pressure at a temperature of more than 900° C.

4) Polishing a bottom of the silicon substrate to remove a thickness of about 5,000 nm. This treatment is conducted to remove a non-conductive $SiO_2$ layer formed at the bottom of the silicon substrate during heat treatment, thus exposing a conductive n-Si and attaching a metal electrode thereto.

5) On the top of the silicon substrate combined with the final product $Zn_2SiO_4$:$Mn^{2+}$, an ITO as a transparent electrode having a thickness of about 1,000 nm is printed by sputtering.

6) Additionally, an In or Al electrode is printed on the bottom of the silicon substrate.

EXAMPLE 9

EL Device Having Quartz Substrate

1) A ZnO:Mn sol solution is applied to a top of an quartz substrate by spin-coating to form a coating layer with a thickness of 1,000 nm.

2) The prepared ZnO:Mn/$SiO_2$ undergoes reaction at 1,200° C. for 3 hours. Here, 95% $H_2/N_2$ gas is added to the reaction and $Zn_2SiO_4$:$Mn^{2+}$ is formed on the top of the silicon substrate while maintaining 1 atm pressure at a temperature of more than 900° C.

3) The top of the quartz substrate having the final product formed thereon is subjected to photolithography so as to form a stripe pattern with a depth of about 1,000 nm at intervals of 5,000 nm. More particularly, after printing a positive photoresist with a thickness of about 500 nm on the top of the substrate by spin-coating, a mask in a stripe pattern with a line width of about 5,000 nm is placed on the substrate, followed by UV exposure. Then, an un-exposed region is eliminated using a developing solution. Finally, using an etching solution such as HF, an area without photoresist is removed.

4) An Al electrode or an ITO transparent electrode is applied to the top of a lithographically treated substrate with a thickness of 500 nm by sputtering. Otherwise, using Ag paste, the substrate is subjected to screen-printing.

5) The photoresist residue is removed from the substrate coated with the electrode.

EXAMPLE 10

Emergency Exit Display Device Using Thin Film Phosphor

1) A substrate material made of $SiO_2$, for example, a quartz substrate is printed using ZnO:Mn sol by spin-coating. Here, the printing process using ZnO:Mn sol may include spin-coating, silkscreen, etc. A thickness of a raw material ranges from 500 to 1,000 nm.

2) The substrate coated with the raw material, that is, $ZnO:Mo/SiO_2$ is subjected to reaction at 1,200° C. for about 3 hours. In this case, 95% $H_2/N_2$ gas is added to the reaction and $Zn_2SiO_4:Mn^{2+}$ is formed on the top of the substrate while maintaining 1 atm pressure at a temperature of more than 900° C.

3) After placing a mask engraved with an emergency exit design on a is top of the substrate having $Zn_2SiO_4:Mn^{2+}$ formed thereon, photoresist is applied thereto. The applied photoresist is cured and un-cured portions are removed from the substrate using a developing solution. The developing solution may be HF to remove the raw material and, using HF, the raw material formed on the substrate except for the emergency exit design is eliminated. The cured photoresist is then removed, thus producing a finally completed product with the emergency exit deign.

4) The final product, that is, a phosphor layer is subjected to surface polishing to reduce roughness, thus improving transparency of the phosphor layer.

Figure 20:
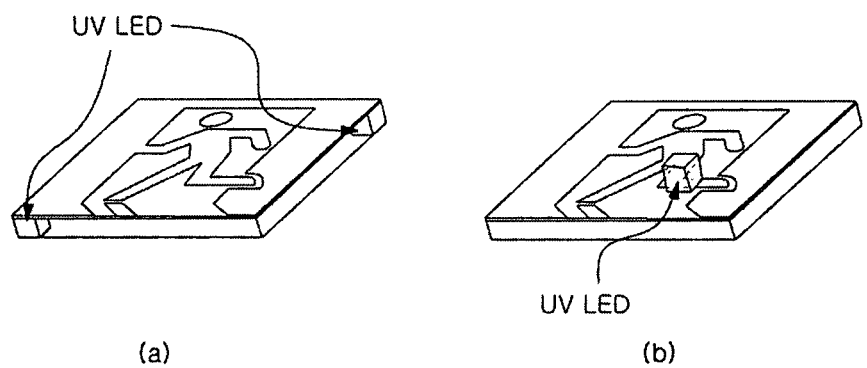
FIGS. 20A and 20B illustrate a display tool having a thin film phosphor for indicating an emergency exit.

5) As shown in FIGS. 20(a) and 20(b), at least one UV LED is fixed to an edge or a bottom of the substrate while a light guide is attached to a lateral side or a rear face of the same.

EXAMPLE 11

Another Emergency Exit Display Device Using Thin Film Phosphor

1) Using a screen engraved with an emergency exit design, ZnO:Mn sol is printed in the emergency exit shape on a substrate material, for example, a quartz substrate. Here, the printing process using ZnO:Mn sol may include spin-coating, silkscreen, etc. A thickness of a raw material ranges from 500 to 1,000 nm.

2) After removing a mask from the substrate, the substrate coated with the raw material, that is, $ZnO:Mo/SiO_2$ is subjected to reaction at 1,200° C. for about 3 hours. In this case, 95% $H_2/N_2$ gas is added to the reaction while maintaining 1 atm pressure at a temperature of more than 900° C.

3) The final product, that is, a phosphor layer is subjected to surface polishing to reduce roughness, thus improving transparency of the phosphor layer.

4) As shown in FIGS. 20(a) and 20(b), at least one UV LED is fixed to an edge or a bottom of the substrate while a light guide is attached to a lateral side or a rear face of the same. A cell for applying power to the UV LED and a light sensor to supply power or stop the same depending on brightness of the surrounding are added to the substrate. If necessary, a flashing device to switch a light on and off may also be added. Other than the UV LED, a blue lighting device may also be mounted on the substrate.

The foregoing emergency exit display device is very thin and easily fixed to a wall side, compared to a common emergency exit lamp. The inventive display tool is transparent before applying power while emitting green light by power application, thus having excellent visibility. Since a UV LED is used, power consumption is considerably decreased to attain economical advantage.

EXAMPLE 12

Decorative Crystal Cup Using Thin Film Phosphor

The present invention may form a thin film phosphor on a surface of a perform material with different shapes including, for example, a wire, a cup, etc. other than a flat plate such as a substrate used in the present invention. The following description will be given to explain an alternative thin film phosphor product using a crystal cup as a preform material.

1) A crystal cup made of $SiO_2$ is placed in the center of an electric furnace while ZnO:Mn powder is introduced into all edges as well as top and bottom of the crystal cup in order to spread throughout inside the electric furnace during gasification thereof. In this case, in order to form a desired thin film phosphor pattern, a mask may be used.

2) While maintaining an inner space of the electric furnace at 2 to 4 atm, the thin film phosphor formation process is conducted at 1,100 to 1,200° C. for 2 hours. This is for forming a $Zn_2SiO_4$:Mn phosphor layer throughout the crystal cup by reacting the gasified ZnO:Mn phosphor powder with $SiO_2$ as a constitutional element of the crystal cup.

3) Roughness of a surface of the crystal cup having a final product formed thereon is reduced without decrease in thickness of the final product, thus retaining inherent features of the crystal cup.

The decorative crystal cup fabricated as described above may emit by irradiation of near ultraviolet light or blue light and exhibit improved decorative features.

As is apparent from the foregoing description, a method for fabrication of a thin film phosphor, a thin film phosphor fabricated by the same and a product using the fabricated phosphor may be used in various industrial applications including, for example, light emitting FPDs, electroluminescent devices, X-ray excitation fluorescent plates, electron excitation fluorescent plates, UV excitation fluorescent plates, blue light excitation fluorescent plates, emergency exit display devices, decorative articles, and the like.

What is claimed is:

1. A method comprising;
preparing at least one substrate having at least one constitutional element for a phosphor and having a single layer structure that does not have any interlayer interface, as well as a raw material comprising all of the constitutional elements for the phosphor except for the at least one constitutional element contained in the substrate, in a chamber; and gradually diffusing the raw material from a surface of the substrate to an inner part of the substrate to form a phosphor layer within the substrate such that a composition of the phosphor layer gradually approaches a composition of the substrate from the surface of the substrate towards the inner part of the substrate without having an interface where a concentration discontinuity of the compositions appears.

2. The method according to claim 1, wherein the phosphor includes at least two elements including an activating agent.

3. The method according to claim 1, wherein the substrate has substantially the same or similar crystal structure as that of the phosphor layer in the preparation process.

4. The method according to claim 3, wherein the substrate includes amorphous quartz, and the raw material and the phosphor material have a hexagonal structure after heat treatment.

5. The method according to claim 3, wherein the substrate includes amorphous quartz and the phosphor material has a texture structure grown only in limited crystal growth orientation after heat treatment.

6. The method according to claim 3, wherein the substrate includes amorphous quartz and a surface of the phosphor layer has unevenness formed in a shape of convex lens having a diameter of 1 to 10 μm.

7. The method according to claim 3, wherein the substrate includes amorphous quartz, the raw material includes ZnO:Mn, and the phosphor layer material comprises $Zn_2SiO_4$:Mn.

8. The method according to claim 3, wherein the substrate includes amorphous quartz, the raw material includes BaO:Eu, and the phosphor layer material comprises $BaSi_2O_5$:Eu.

9. The method according to claim 3, wherein the substrate includes single crystal or polycrystalline $Al_2O_3$, and the raw material and the phosphor layer material have a hexagonal structure after heat treatment.

10. The method according to claim 1, wherein the formation process is conducted by evaporating the raw material of the phosphor constitutional elements to deposit on the surface of the substrate and, at the same time, subjecting the phosphor constitutional elements deposited on the substrate to thermal diffusion or plasma diffusion.

11. The method according to claim 1, further comprising a step of forming a transparent layer on a surface of the phosphor layer after the formation process.

12. The method according to claim 10, wherein the formation process includes heating an inner space of the chamber at a temperature less than a substrate deforming or melting temperature while maintaining the same under vacuum, wherein an internal pressure of the chamber ranges from $10^{-4}$ to $10^{+3}$ Torr at an initial stage of the formation process.

13. The method according to claim 1, wherein the formation process includes heat treatment of the substrate at 700 to 2,000° C. after depositing or applying the raw material to a surface of the substrate.

14. A thin film phosphor, consisting of a substrate comprising a phosphor layer containing phosphor constitutional elements diffused from a surface of the substrate to an inner part of the substrate,
wherein the substrate comprises at least one from the phosphor constitutional elements, wherein a constitutional composition of the phosphor layer is gradually varied to approach a constitutional composition of the substrate from the surface of the substrate towards the inner part of the substrate, wherein the thin film phosphor has a single layer structure that has neither any interlayer interface nor any compositional interface where a concentration discontinuity of the constitutional compositions appears.

15. The thin film phosphor according to claim 14, wherein the phosphor layer has a texture structure with limited crystal orientations of 2 to 10 wherein each crystal orientation is defined according to Miller index in X-ray diffraction pattern.

16. A thin film phosphor product having the thin film phosphor as set forth in claim 14, wherein the product is at least one selected from a light emitting FPD, an electroluminescent device, an X-ray excitation fluorescent plate, an electron excitation fluorescent plate, a UV excitation fluorescent plate and a blue light excitation fluorescent plate.

17. The thin film phosphor product according to claim 16, wherein said diffusing step is continued until a thickness of the phosphor layer from the surface of the substrate reaches 0.3 to 30 μm.

* * * * *